(12) United States Patent
Chen

(10) Patent No.: US 8,432,670 B2
(45) Date of Patent: Apr. 30, 2013

(54) DISK DRIVE ASSEMBLY

(75) Inventor: Li-Ping Chen, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 300 days.

(21) Appl. No.: 12/903,076

(22) Filed: Oct. 12, 2010

(65) Prior Publication Data

US 2011/0289521 A1  Nov. 24, 2011

(30) Foreign Application Priority Data

May 24, 2010 (CN) .......................... 2010 1 0181426

(51) Int. Cl.
*G06F 1/16* (2006.01)
*H05K 5/00* (2006.01)
*H05K 7/00* (2006.01)

(52) U.S. Cl.
USPC .................................................... 361/679.02

(58) Field of Classification Search ........................ None
See application file for complete search history.

(56) References Cited

U.S. PATENT DOCUMENTS

| | | | | |
|---|---|---|---|---|
| 4,969,838 A | * | 11/1990 | Himes et al. .................. 439/352 |
| 5,481,431 A | * | 1/1996 | Siahpolo et al. ......... 361/679.31 |
| 5,537,292 A | * | 7/1996 | Bowen .......................... 361/737 |
| 5,586,003 A | * | 12/1996 | Schmitt et al. ........... 361/679.58 |
| 5,588,728 A | * | 12/1996 | Eldridge et al. ........... 312/332.1 |
| 5,726,922 A | * | 3/1998 | Womble et al. ............... 361/726 |
| 5,914,854 A | * | 6/1999 | Holt .......................... 361/679.23 |
| 5,914,855 A | * | 6/1999 | Gustafson et al. ....... 361/679.34 |
| 6,421,236 B1 | * | 7/2002 | Montoya et al. ......... 361/679.58 |
| 6,606,256 B1 | * | 8/2003 | Lee et al. ...................... 361/825 |
| 6,619,766 B1 | * | 9/2003 | Mansueto .................. 312/223.1 |
| 6,738,261 B2 | * | 5/2004 | Vier et al. ..................... 361/740 |
| 6,791,843 B1 | * | 9/2004 | Dobbs et al. .................. 361/758 |
| 6,822,858 B2 | * | 11/2004 | Allgeyer et al. ......... 361/679.34 |
| 6,975,519 B2 | * | 12/2005 | Siahpolo et al. .............. 361/798 |
| 7,417,866 B1 | * | 8/2008 | Beseth et al. ................. 361/732 |
| 7,817,430 B2 | * | 10/2010 | Sherrod et al. ................ 361/724 |
| 2003/0117779 A1 | * | 6/2003 | Gough et al. ................. 361/728 |
| 2003/0198023 A1 | * | 10/2003 | Wakabayashi et al. ....... 361/719 |
| 2005/0185388 A1 | * | 8/2005 | Chen et al. .................... 361/801 |
| 2007/0124529 A1 | * | 5/2007 | Carr et al. ..................... 710/317 |
| 2008/0128579 A1 | * | 6/2008 | Chen et al. .................... 248/694 |
| 2009/0091893 A1 | * | 4/2009 | Chen et al. .................... 361/726 |
| 2009/0106995 A1 | * | 4/2009 | Zhang et al. .................... 33/533 |
| 2009/0122496 A1 | * | 5/2009 | Nishimoto et al. ........... 361/728 |

* cited by examiner

*Primary Examiner* — Lisa Lea Edmonds
*Assistant Examiner* — Xanthia C Cunningham
(74) *Attorney, Agent, or Firm* — Altis Law Group, Inc.

(57) ABSTRACT

A tray assembly for mounting a disk drive includes an enclosure; and a tray mounted to the enclosure. The tray includes a tray body configured to receive the disk drive, a handle pivotably mounted to the tray body, and a securing member pivotably mounted to the tray body. The handle is configured to secure the tray body to the enclosure as the handle rotates. The securing member is configured to engage the handle as the tray body is in a secured state.

16 Claims, 5 Drawing Sheets

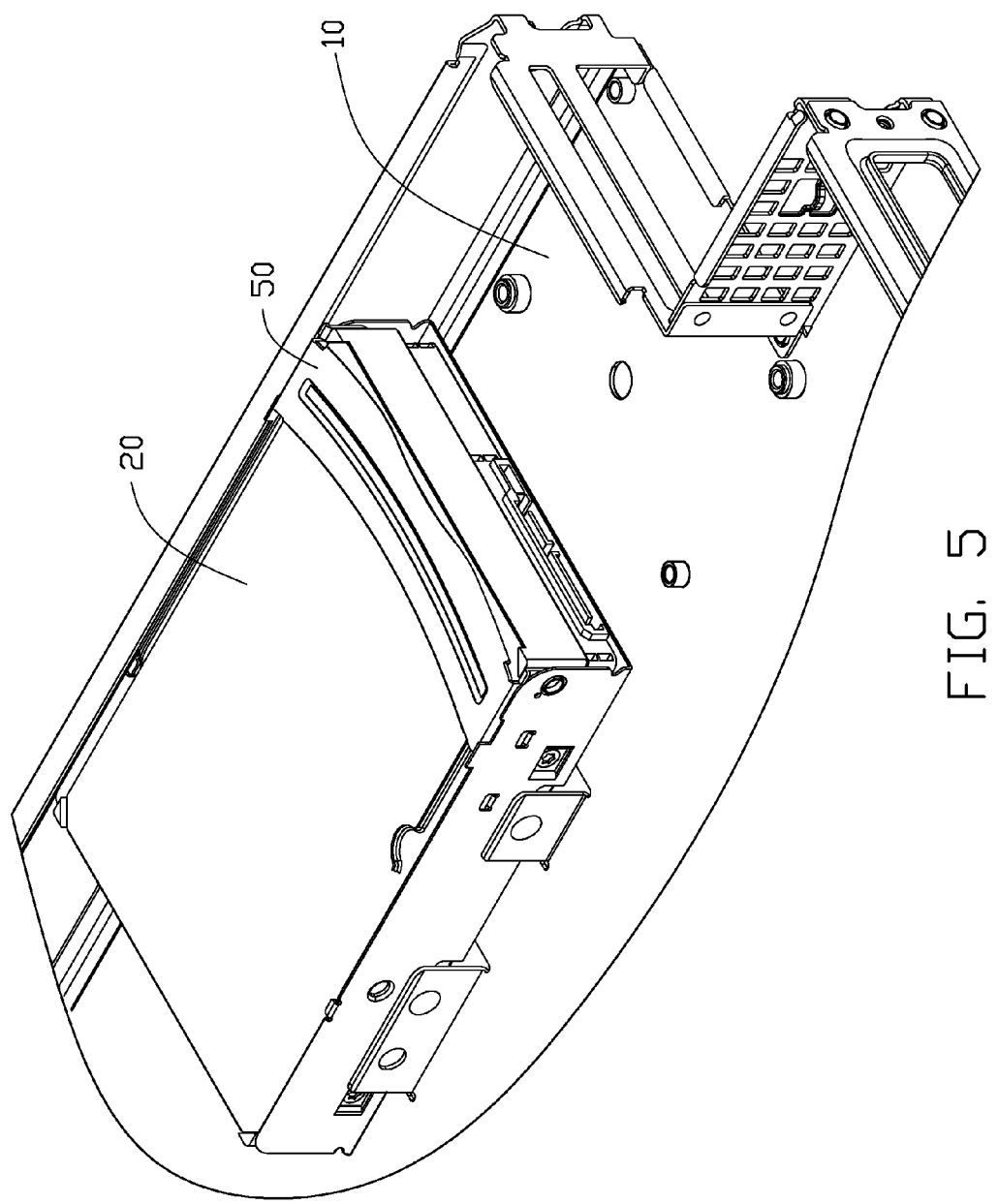

DISK DRIVE ASSEMBLY

BACKGROUND

1. Technical Field

The present disclosure relates to disk drive assemblies.

2. Description of Related Art

A typical personal computer includes data storage devices such as a hard disk drive (HDD), a floppy disk drive, and a compact disc-read only memory (CD-ROM) drive. Conventionally, the data storage devices are attached to a chassis of a computer enclosure using screws. A tool such as a screwdriver is used to fasten the screws, and to unfasten the screws when removing the data storage devices. Such operations are laborious and time-consuming. Furthermore, unintentional accidents may occur during operations (i.e. operator dropping tools and screws). When this happens, other internal components of the computer are liable to be damaged.

BRIEF DESCRIPTION OF THE DRAWINGS

FIG. 5 is an assembled view of FIG. 1.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
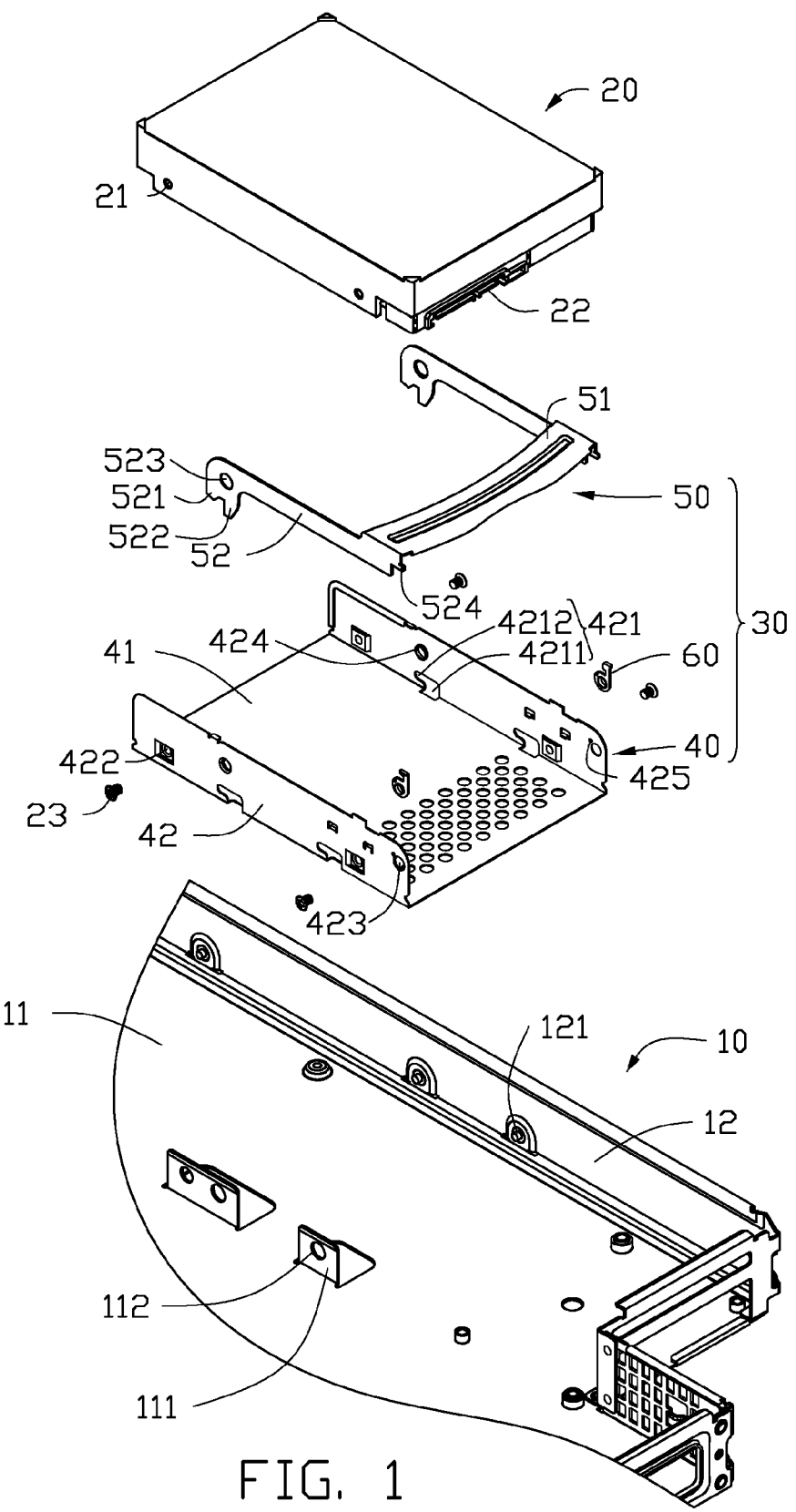
FIG. 1 is an exploded, isometric view of a tray assembly of an embodiment and a disk drive, the tray assembly including a securing member.
Figure 2:
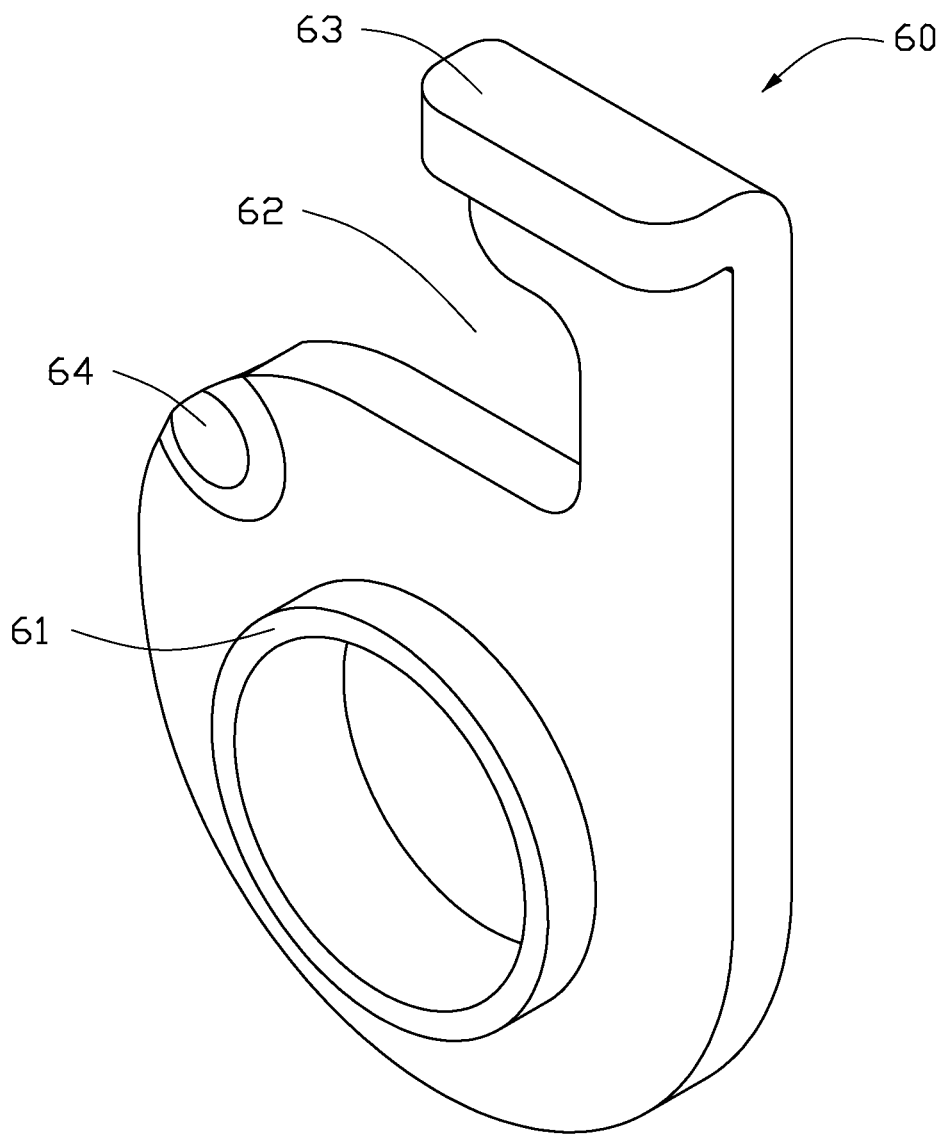
FIG. 2 is an isometric view of the securing member of FIG. 1.
Figure 3:
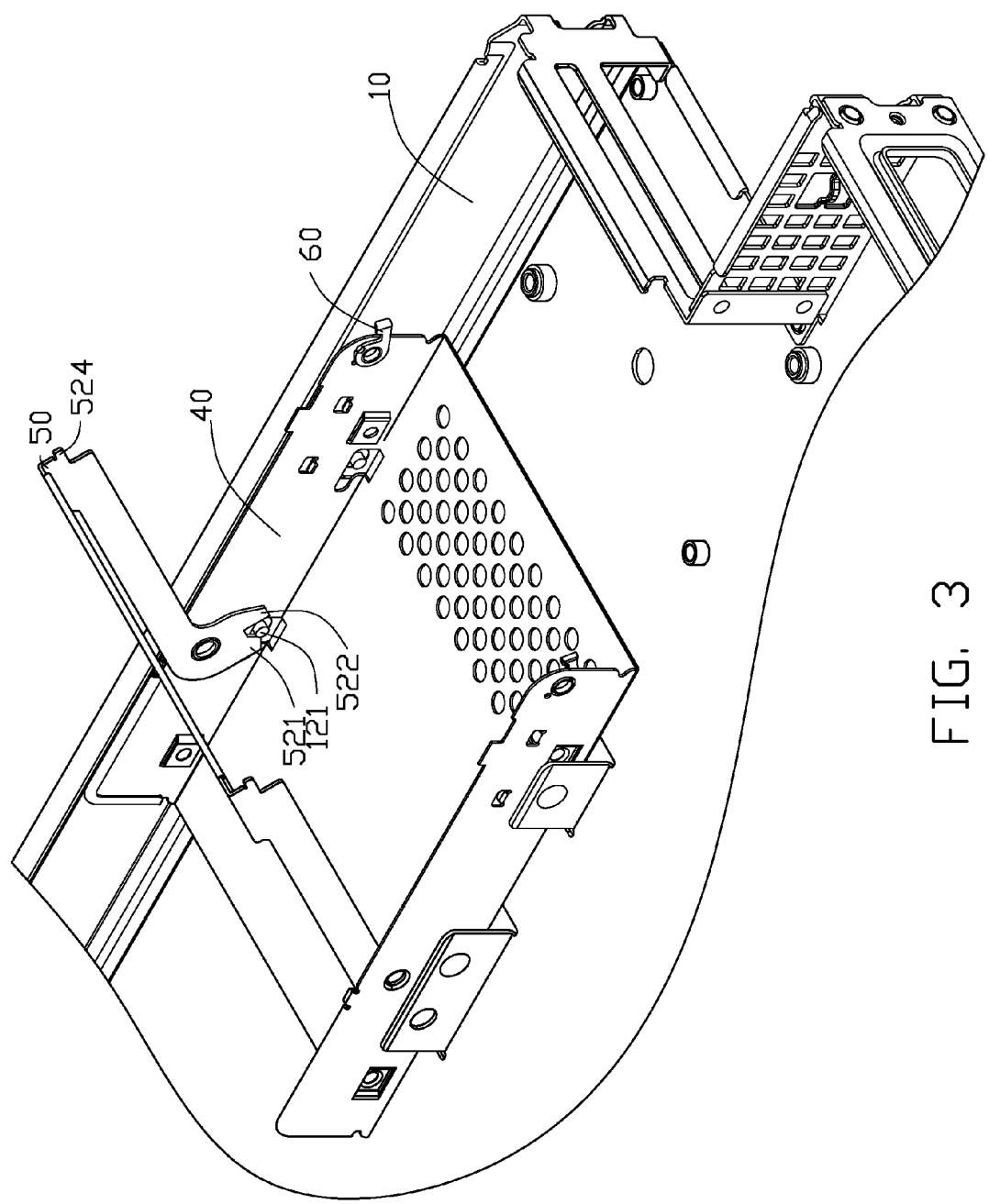
FIG. 3 is pre-assembled, pre-locked view of the tray assembly of FIG. 1.
Figure 4:
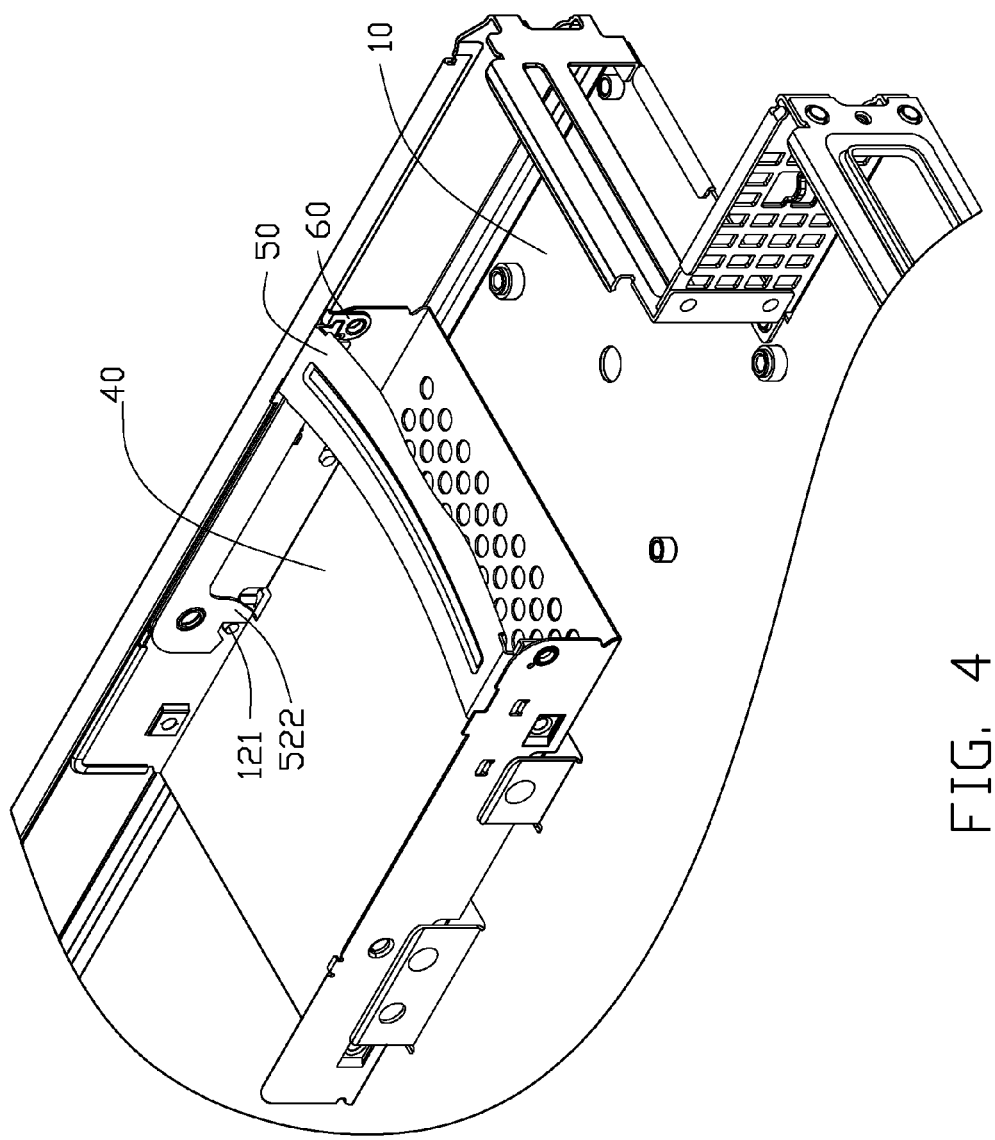
FIG. 4 is an assembled, locked view of the tray assembly of FIG. 1.

Referring to FIGS. 1 and 2, a tray assembly includes an enclosure 10, a disk drive 20, and a tray 30 for receiving the disk drive 20.

The enclosure 10 includes a bottom wall 11 and a side wall 12. The bottom wall 11 includes two mounting portions 111. Each mounting portion 111 includes a first protrusion 112. The side wall 12 includes two second protrusions 121.

Two mounting holes 21 are respectively defined in opposite sides of the disk drive 20. The disk drive 20 includes an inserting terminal 22 at the rear side thereof.

The tray 30 includes a tray body 40, a handle 50, and two securing members 60. The tray body 40 includes a bottom panel 41 parallel to the bottom wall 11 and two side panels 42 extending from opposite sides of the bottom panel 41. Two mounting openings 421 are defined in a connecting portion between each side panel 42 and the bottom panel 41. Each mounting opening 421 includes a larger part 4211 and a narrower part 4212 connecting to the larger part 4211.

Two through holes 422 are defined in each side panel 42 corresponding to the mounting holes 21 of the disk drive 20. A rotating hole 423 is defined in each side panel 42. Each side panel 42 includes a pivoting portion 424 extending from an inner surface of the side panel 42 and a positioning portion 425 protruding from the inner surface of the side panel 42.

The handle 50 includes a handling portion 51 and two connecting arms 52 extending from opposite sides of the handling portion 51. Each arm 52 includes a first pushing portion 521 and a second pushing portion 522 at a free end thereof. A pivoting hole 523, corresponding to the pivoting portion 424, is defined in each connecting arm 52, adjacent to the first pushing portion 521 and the second pushing portion 522. The connecting arm 52 includes an engaging portion 524, adjacent to the handling portion 51. Each connecting arm 52 is parallel to the side panel 42.

Each securing member 60 includes a rotating portion 61 corresponding to the rotating hole 423 of the tray body 40 and a flange 63. An engaging cutout 62 is defined in the securing member 60 corresponding to the engaging portion 524 of the handle 50. A positioning cutout 64 is defined in the securing member 60 corresponding to the positioning portion 425 of the tray body 40. The flange 63 is substantially perpendicular to the side panel 42 of the tray body 40.

Referring to FIGS. 1 through 5, in assembly of the tray 30, the pivoting portions 424 of the tray body 40 are pivotably connected to the pivoting holes 523 of the handle 50 to mount the handle 50 to the tray body 40. The rotating portions 61 of the two securing members 60 are pivotably connected to the rotating holes 423 of the tray body 40 to mount the securing members 60 to the tray body 40.

In assembly of the tray 30 and the disk drive 20, the mounting holes 21 of the disk drive 20 are aligned with the through holes 422 of the tray body 40. Four securing elements 23, such as screws, are inserted into the through holes 422 and the mounting holes 21 to secure the disk drive 20 to the tray 30.

In assembly of the tray 30 with the disk drive 20 and the enclosure 10, the first protrusions 112 and the second protrusions 121 are received in the larger parts 4211 of the mounting openings 421. The handling portion 51 of the handle 50 rotates along a first direction to move close to the bottom panel 41 of the tray body 40. The second pushing portions 522 engages the corresponding first protrusion 112 and the corresponding second protrusion 121, which enables the narrower parts 4212 to move close to the first protrusion 112 an the second protrusion 121. The first protrusion 112 and the second protrusion 121 are received in the narrower parts 4212 when the handling portion 51 contacts the disk drive 20. At this time, the first protrusion 112 and the second protrusion 121 are respectively disposed between the corresponding first pushing portion 521 and the corresponding second pushing portion 522. The second pushing portions 522 are configured to prevent the tray body 40 from moving parallel to the bottom panel 41. The two securing members 60 rotates along a second direction opposite to the first direction to enable the engaging cutouts 62 to engage the engaging portions 524 of the handle 50. At this time, the positioning portions 425 of the tray body 40 are received in the positioning cutout 64 respectively.

In disassembly, the two securing members 60 rotate along the first direction to enable the engaging cutout 62 to disengage the engaging portion 524. The handling portion 51 of the handle 50 rotates along the second direction to enable the first pushing portions 521 to engage the corresponding first protrusion 112 and the second protrusion 121. The larger parts 4211 are driven to move close to the first protrusion 112 and the second protrusion 121. The tray 30 is pulled up from the enclosure 10 when the first protrusion 112 and the second protrusion 121 are disposed in the larger parts 4211.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A tray assembly, comprising:
an enclosure; and
a tray mounted to the enclosure, the tray comprising a tray body configured to receive a disk drive, a handle pivotably mounted to the tray body, and a securing member pivotably mounted to the tray body; the handle is configured to secure the tray body to the enclosure as the handle rotates; and the securing member is configured to rotate to engage the handle as the tray body is in a secured state;
wherein the handle is configured to rotate along a first direction to secure the tray body to the enclosure, and the securing member is configured to rotate along a second direction, opposite to the first direction, to engage the handle.

2. The tray assembly of claim 1, wherein the securing member comprises a flange, and the securing member is capable of being rotated by operating the flange.

3. The tray assembly of claim 2, wherein the handle comprises a handling portion and a connecting arm extending from the handling portion; the tray body comprises a bottom panel and a side panel, that perpendicularly extends from the bottom panel; the connecting arm is pivotably mounted to the side panel; and the flange is substantially perpendicular to the side panel.

4. The tray assembly of claim 3, wherein the connecting arm is substantially parallel to the side panel.

5. The tray assembly of claim 2, wherein the handle comprises an engaging portion, and an engaging cutout is defined in the securing member and configured to engage the engaging portion.

6. The tray assembly of claim 5, wherein the handle further comprises a handling portion and a connecting arm, extending from the handling portion; and the engaging portion is disposed on an end of the connecting arm adjacent to the handling portion.

7. The tray assembly of claim 1, wherein the securing member comprises a rotating portion, and a rotating hole is defined in the tray body corresponding to the rotating portion.

8. The tray assembly of claim 1, wherein the tray body comprises a pivoting portion, and a pivoting hole is defined in the handle corresponding to the pivoting portion.

9. A disk drive assembly, comprising:
an enclosure, the enclosure comprising a bottom wall;
a disk drive; and
a tray mounted to the enclosure, the tray comprising a tray body placed on the bottom wall and configured to receive the disk drive, a handle pivotably mounted to the tray body, and a securing member pivotably mounted to the tray body; the handle is configured to enable the tray body to move in a direction, that is substantially parallel to the bottom wall, to be secured to the enclosure as the handle rotates; and the securing member is configured to engage the handle to prevent the handle from rotating as the tray body is secured to the enclosure;
wherein the handle is configured to rotate along a first direction to secure the tray body to the enclosure, and the securing member is configured to rotate along a second direction opposite to the first direction to engage the handle.

10. The disk drive assembly of claim 9, wherein the securing member comprises a flange, and the securing member is capable of being rotated by operating the flange.

11. The disk drive assembly of claim 10, wherein the handle comprises a handling portion and a connecting arm extending from the handling portion; the tray body comprises a bottom panel and a side panel, that perpendicularly extends from the bottom panel; the connecting arm is pivotably mounted to the side panel; and the flange is substantially perpendicular to the side panel.

12. The disk drive assembly of claim 11, wherein the connecting arm is substantially parallel to the side panel.

13. The disk drive assembly of claim 10, wherein the handle comprises an engaging portion, and an engaging cutout is defined in the securing member and configured to engage the engaging portion.

14. The disk drive assembly of claim 13, wherein the handle further comprises a handling portion and a connecting arm extending from the handling portion; and the engaging portion is disposed on an end of the connecting arm adjacent to the handling portion.

15. The disk drive assembly of claim 9, wherein the securing member is pivotably mounted to the tray body; the securing member comprises a rotating portion, and a rotating hole is defined in the tray body corresponding to the rotating portion.

16. The disk drive assembly of claim 9, wherein the tray body comprises a pivoting portion, and a pivoting hole is defined in the handle corresponding to the pivoting portion.

* * * * *